Nov. 9, 1954

C. O. KISER 2,693,748

TRACTOR MOUNTED BEDDER

Filed May 25, 1950

Inventor

CLIFFORD O. KISER

By

AGENT

Inventor
CLIFFORD O. KISER
AGENT

United States Patent Office 2,693,748
Patented Nov. 9, 1954

2,693,748

TRACTOR MOUNTED BEDDER

Clifford O. Kiser, Rock Island, Ill., assignor to J. I. Case Company, Racine, Wis., a corporation of Wisconsin Application May 25, 1950, Serial No. 164,074

8 Claims. (Cl. 97—54)

This invention relates in general to agricultural implements, and particularly to tractor mounted bedders. Bedders are used for the purpose of working the earth into longitudinally extending, laterally spaced ridges or beds separated by shallow ditches. This method of making beds is employed in the raising of vegetables such as beans and tomatoes, and in regions which receive a substantial amount of moisture. A bedder comprises a pair of laterally spaced opposed disc units usually carried by a tractor and adapted either to throw up a bed of soil between them or dig out a ditch, depending upon the relative positions of the discs.

Instances may arise in bedding when the "crown" or degree of steepness of the beds needs to be varied so that the middles thereof will be higher or lower relative to the ditches between them.

It is an object of this invention to provide a bedder which has provisions for adjusting the disc units so as to obtain beds of various depth of "crown"; "crown" signifying the amount of steepness of the sides of the bed relative to the horizontal.

Another object of this invention is to provide a bedder disc unit bracket which is rigid and will retain adjustments.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

Referring to the drawings.

Figure 1:
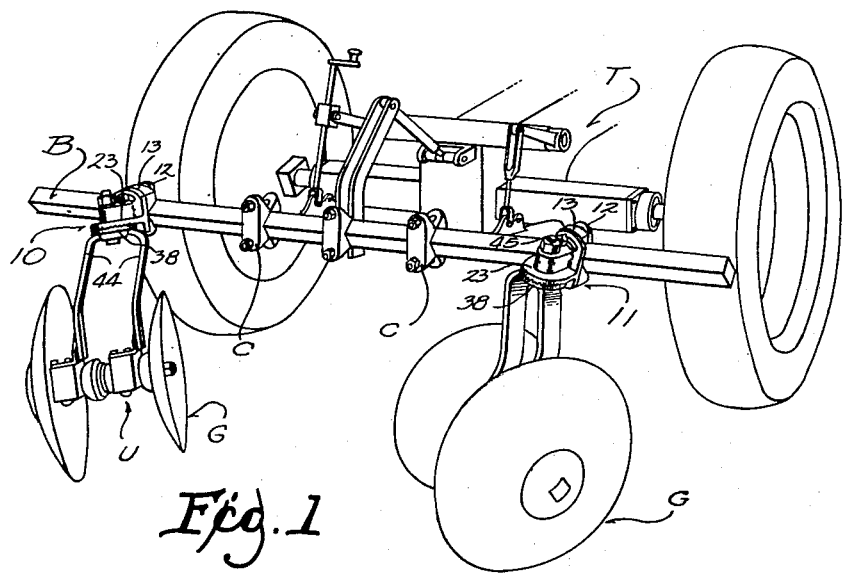
Fig. 1 shows a rear perspective view of a portion of tractor having the invention mounted thereon.

Referring to Fig. 1, T is a tractor having mounted rearwardly thereof a laterally-extending tool bar B which carries one or more disc units G. The arrangement of the mounting of tool bar B on tractor T is of the type which permits the bar B to be raised for transport and adjusted to the proper depth for working the soil. However, the details of the above mounting are well-known to those skilled in the art and need not be further described.

Referring to the drawings in general; tool bar B, in this instance, is of square cross-section and can be either solid or tubular. Bar B is positioned with the surfaces thereof at an angle of 45 degrees relative to the ground so as to accommodate the clamp member which will be later described. Bar B extends transversely and is spaced rearwardly of the tractor and of a length sufficient to accommodate the maximum spacing required between the disc units. Clamps C are used to mount the tool bar on the tractor, and need not be further described.

Figure 2:
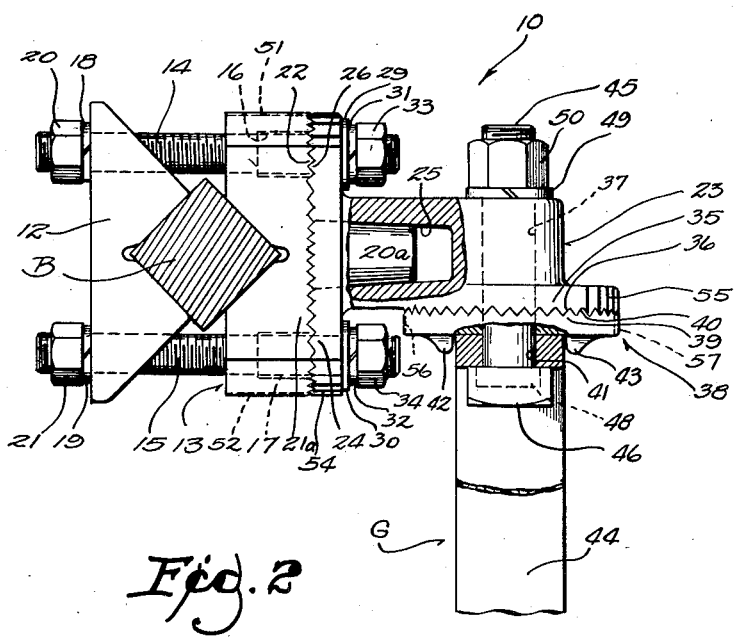
Fig. 2 shows a fragmentary elevational side view of the mounting bracket.
Figure 3:
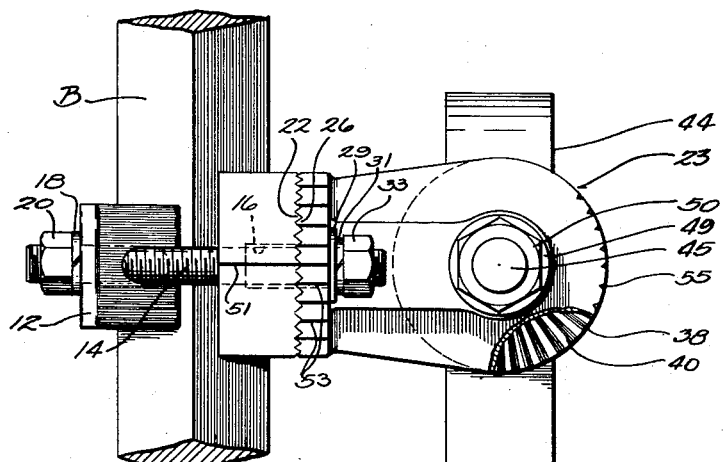
Fig. 3 shows a fragmentary plan view of the bracket.
Figure 4:
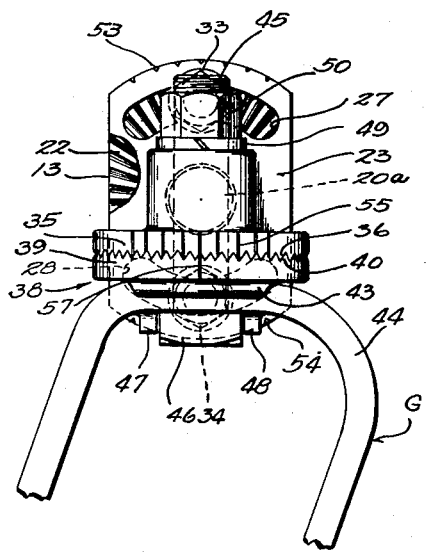
Fig. 4 shows a fragmentary elevational view looking forward from the rear of the tractor and Fig. 5 is similar to Fig. 4 but with the bracket adjusted angularly.
Figure 5:
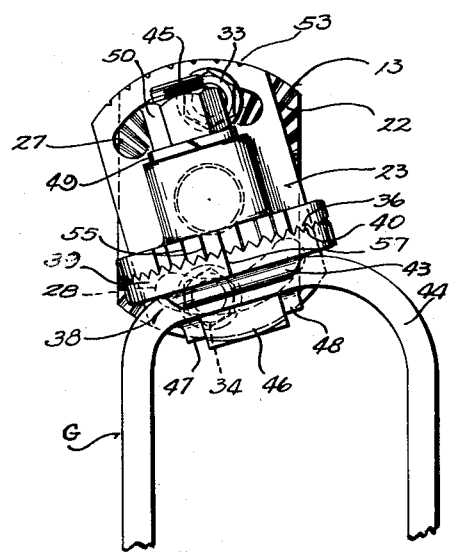

In this instance, units G are secured to bar B by brackets 10 and 11. Brackets 10 and 11 are adjustable along bar B to suit the width of the bed to be made. Units G are identical with the exception that the discs are opposed in curvature so only one unit will be described. Referring to Figs. 2 and 3, a clamp member 12 made of a forging or cast steel or other suitable material, is located as shown on bar B on the side nearest the tractor. Clamp plate 12 has a V-notch which fits bar B and prevents the plate 12 from turning and provides sufficient surface contact between bar B and plate 12 to prevent shifting along the bar under pressure of the soil on the discs.

A pivot member 13 is fitted to bar B in a manner similarly to that with regard to clamp plate 12. Pivot member 13 and clamp plate 12 comprise the clamp by which the disc unit is secured in fixed position. A pair of threaded members 14 and 15 are threadedly secured in pivot member 13 by threads which for economy of production extend only partially through the member 13. The holes are enlarged at 16 and 17 as shown in Fig. 2. Threaded members 14 and 15 extend through plate 12 a suitable distance and lock washers 18 and 19, and nuts 20 and 21 secure plate 12 and pivot member 13 to bar B. Pivot member 13 is provided with a rearwardly extending pivot portion 20a which is in this instance an integral part of pivot member 13. Pivot portion 20a is tapered slightly to facilitate production as shown in Fig. 2. The rearwardly directed surface 21a of pivot member 13 is perpendicular to the axis of pivot portion 20a and is provided with serrations 22 which extend radially outwardly from the axis of pivot portion 20a. The purpose of serrations 22 will appear as the description progresses. A pivot bracket 23 is located rearwardly of pivot member 13 and has a surface 24 co-extensive with face 21a of pivot member 13. Pivot bracket 23 has a recess 25 fitted to pivot portion 20a allowing pivot bracket 23 to be adjusted about the axis of pivot portion 20a. Surface 24 has serrations 26 which correspond to serrations 22 on pivot member 13. Serrations 22 and 26 co-act to hold adjustments made between pivot member 13 and pivot bracket 23 against forces tending to rotate the pivot bracket about the pivot portion 20a.

Threaded members 14 and 15 extend rearwardly a suitable distance beyond pivot bracket 23 to provide clamping means for the pivot bracket 23. Pivot bracket 23 is provided with slots 27 and 28 which are arcuate in shape, and coincide with a circle having its center coinciding with the axis of pivot portion 20a. Slots 27 and 28 are of a length which will allow suitable angular adjustments to be made, and of a width to allow threaded members 14 and 15 to freely move therein.

Pivot member 13 and pivot bracket 23 are held in the desired adjustment by washers 29 and 30, lock washers 31 and 32 and nuts 33 and 34. Owing to the fact that threaded members 14 and 15 are threaded into pivot member 13, the position of the bracket 10 is not disturbed when making angular adjustments of the unit G. Pivot bracket 23 extendss rearwardly as shown in Fig. 2 and is provided with a bearing face 35 which is directed substantially parallel to the axis of pivot portion 20. A hole 37 is provided in pivot bracket 23 having the axis thereof perpendicular to surface 35. Surface 35 is provided with serrations 36 which are directed radially toward the axis of hole 37.

A yoke bracket 38 is positioned co-extensive with the surface 35 and has a similar surface 39 and serrations 40 coacting with serrations 36. A hole 41 is provided in yoke bracket 38 which is co-axial with hole 37 of pivot bracket 23. Yoke bracket 38 has two downwardly directed lugs 42 and 43 spaced a suitable distance apart on the lower surface of the bracket. Lugs 42 and 43 define a channel to accommodate a yoke 44. The purpose of lugs 42 and 43 is to prevent yoke 44 from turning relatively to yoke bracket 38. Yoke 44 is made of bar stock, in this instance, and of the shape shown. Yoke 44 is provided with a hole co-axial with holes 37 and 41 and a bolt 45 is passed through yoke 44, yoke bracket 38 and pivot bracket 23. Bolt 45 is provided with a square head 46. A pair of lugs 47 and 48 are secured to the under surface of yoke 44. One of lugs 47 and 48 being positioned on each side of head 46 in order to prevent the latter from rotating. A washer 49 and a nut 50 complete the means of tightening yoke 44, yoke bracket 38 and pivot bracket 23, after the desired adjustments have been made.

Yoke bracket 44 extends downwardly and terminates in the bearing assembly U of the disc unit. The latter construction is conventional and need not be further described.

In order that the several adjustments may be duplicated after being disturbed, index notches have been provided on the several co-acting members.

Referring to Figs. 2 to 5 inclusive, pivot member 13 is provided with one notch 51 which is directed fore-and-aft. A similar notch 52 is provided on the lower edge of pivot member 13 so that either end of the member 13 can be located at the top.

Pivot bracket 23 has a plurality of notches 53 at the top which are adapted to register with notch 51 in various positions of adjustment. A plurality of notches 54 are also provided at the bottom of pivot bracket 23 to register with notch 52 if adjustments are more conveniently made from below the tool bar B.

Pivot bracket 23 is also provided with a plurality of notches 55 on the edge normal to the surface 35. Yoke bracket 38 is provided with notches 56 and 57, spaced 180° apart on the edge normal to the surface 39. Two notches are provided so that adjustments can be made with the disc units facing either outwardly or inwardly.

In summary, it will be clear that this invention provides a bedder which allows adjustment of the axis of the disc units in a horizontal plane as well as a vertical plane. The latter adjustment provides means to vary the "crown" of the bed from one of shallow depth to one having steep sides by making appropriate vertical and horizontal adjustments.

The above being a complete description of an illustrative embodimet of the invention, what is claimed as new and desired to be secured by Letters Patent of the United States is:

1. In combination with a tractor having a laterally extending tool bar carrying a pair of disc units, brackets securing said units to said tool bar, each of said brackets comprising a clamp plate, a pivot member having a bearing face, a pivot bracket having a first bearing face co-extensive with the bearing face on said pivot member, said bearing faces provided with complementary serrations to facilitate fixing said pivot bracket in adjustment relative to said pivot member, said pivot bracket provided with a second bearing face lying substantially in a plane normal to said first bearing face, a yoke bracket having a bearing face co-extensive with said second bearing face, means to adjustably secure said pivot bracket and yoke bracket in fixed relation, said last mentioned co-extensive bearing faces having serrations to facilitate fixing said yoke bracket in adjustment relative to said pivot bracket, clamp members extending through said clamp plate, and said pivot bracket, and threadedly engaged in said pivot member, means on said clamp members to secure said clamp plate and said pivot member in fixed relation to said bar and means on said clamp members to secure said pivot member and said pivot bracket in adjusted relation.

2. In combination with a tractor having a tool bar carrying a disc unit supported by a yoke, a bracket securing said unit to said tool bar, said bracket comprising a clamp plate, a pivot member having a rearwardly extending horizontal pivot pin and a bearing face normal to the axis of said pin, a pivot bracket having a recess complementary to said pivot pin and a bearing face co-extensive with the bearing face on said pivot member, said bearing faces provided with means to facilitate fixing said pivot bracket in adjustment relative to said pivot member, said pivot bracket provided with a second bearing face lying substantially on a plane parallel to the axis of said pivot pin, a yoke bracket having a bearing face co-extensive with said second bearing face and provided with a plurality of lugs spaced apart to receive said yoke bracket therebetween, said last mentioned co-extensive bearing faces having complementary means to facilitate fixing said yoke bracket in adjustment relative to said pivot bracket, clamp means secured in said pivot member and extending freely through said clamp plate and said pivot bracket, and means threadedly engaged to said clamp means to secure said clamp plate and said pivot member in fixed position on said bar, and means threadedly engaged on said clamp means to secure said pivot member and said pivot bracket in adjusted relation and means to secure said pivot bracket, said yoke bracket and said yoke in fixed relation.

3. In combination with a tractor having a tool bar carrying a pair of disc units, brackets securing said units to said tool bar, each of said brackets comprising a clamp plate, a pivot member having a rearwardly extending horizontal pivot member and a bearing face, a pivot bracket having a recess complementary to said pivot member and a bearing face co-extensive with the bearing face on said pivot member, said bearing faces provided with complementary serrations to facilitate fixing said pivot bracket in adjustment relative to said pivot member, a second bearing face on said pivot bracket lying substantially in a plane parallel to the axis of said pivot member, a yoke bracket having a bearing face co-extensive with said second bearing face and provided with a means to angularly fix said unit, unitary means to clamp said pivot member and said pivot bracket in fixed relation and means to secure said pivot bracket and said yoke bracket in fixed relation.

4. In a bedder for use with a tractor having a transverse rearwardly mounted drawbar the combination with said drawbar of a disk unit carrying element depending from said drawbar, a disk unit on said element, a clamping plate on said drawbar, a pivot member on said drawbar disposed substantially opposite said clamping plate, a pivot shaft on said pivot member and extending generally in the direction of travel, a pivot bracket adjustably secured in fixed relation to said depending element, journaled on said pivot shank, and having a slotted flange in juxtaposition to said pivot member, said pivot bracket being pivotally carried by said pivot shank for swinging movement of itself and said depending element in a direction transverse to the travel of the disk unit, and a bolt threadedly secured in said pivot member and extending through said clamping plate, and said slotted flange for clamping said clamping plate and said pivot member on said drawbar and for clamping said flange against said pivot member for maintaining various positions of adjustment of said depending element and its attached disk unit.

5. In a tractor having a transverse tool bar and a disc unit, means to secure said unit to said bar, comprising a clamp plate adjacent said bar, a pivot member adjacent said bar and opposed to said plate and having a transverse serrated face, a pivot bracket having a complementary serrated face and engaging said first-mentioned face, clamp members extending fore-and-aft and threadedly engaged with said pivot member and freely engaged in said clamp plate and said pivot bracket, means on said clamp members to secure said clamp plate and said pivot member in fixed relation on said bar, means on said clamp members to secure said pivot member and said pivot bracket in adjusted relation and means to secure said unit to said pivot bracket.

6. A means to support a disc unit on a tool bar, said unit provided with a yoke, comprising a clamp plate adjacent said bar, a pivot member adjacent said bar and opposed to said plate, said pivot member provided with a transverse face, a pivot bracket having a face engaging said first-mentioned face, means to secure said yoke to said pivot bracket, clamp members extending fore-and-aft and threadedly engaged with said pivot member and freely engaged in said clamp plate and said pivot bracket, means on said clamp members to secure said clamp plate and said pivot member in fixed relation on said bar, and means on said clamp members to secure said pivot member and said pivot bracket in adjusted relation.

7. A means to support a disc unit on a tool bar, said unit provided with a unit gang bracket, comprising a clamp portion adjacent said bar, a pivot portion opposed to said clamp portion, said pivot portion having a rearwardly disposed face, a pivot bracket having a face contacting said first-mentioned face, means to secure said unit bracket to said pivot bracket for adjustment about a vertical axis, clamp members extending through said clamp portion, and said pivot bracket, and fixed in said pivot portion, means on said clamp members to secure said clamp portion and said pivot portion in fixed relation on said bar, and means to secure said pivot portion and said pivot bracket in adjusted relation.

8. A means to secure a disc unit provided with a support, to a tool bar, comprising a clamp portion and a pivot portion on opposed sides of said bar, said pivot portion having a rearwardly extending face, a pivot bracket having a forwardly extending face in contact with said rearwardly-extending face, means to secure said support to said pivot bracket, clamp members extending freely through said clamp portion and said pivot bracket and secured against displacement in said pivot portion, means on said clamp members to secure said clamp portion, and said pivot portion in fixed relation on said bar, and means on said clamp members to secure said pivot portion and said pivot bracket in adjustable relation.

References Cited in the file of this patent

UNITED STATES PATENTS

| Number | Name | Date |
|---|---|---|
| 733,516 | Swanson | July 14, 1903 |
| 931,928 | Hulce | Aug. 24, 1909 |
| 1,906,113 | Silver | Apr. 25, 1933 |
| 2,222,115 | Mott | Nov. 19, 1940 |